(12) United States Patent
Sato

(10) Patent No.: US 10,207,546 B2
(45) Date of Patent: Feb. 19, 2019

(54) PNEUMATIC TIRE

(71) Applicant: TOYO TIRE & RUBBER CO., LTD., Osaka-shi, Osaka (JP)

(72) Inventor: Yoshiki Sato, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 428 days.

(21) Appl. No.: 14/969,676

(22) Filed: Dec. 15, 2015

(65) Prior Publication Data

US 2016/0176237 A1 Jun. 23, 2016

(30) Foreign Application Priority Data

Dec. 22, 2014 (JP) ................................. 2014-259264

(51) Int. Cl.
*B60C 11/03* (2006.01)
*B60C 11/13* (2006.01)

(52) U.S. Cl.
CPC ...... *B60C 11/1376* (2013.01); *B60C 11/0302* (2013.01); *B60C 11/0309* (2013.01); *B60C 11/1315* (2013.01); *B60C 11/1323* (2013.01); *B60C 11/1392* (2013.01); *B60C 2011/0334* (2013.01); *B60C 2011/0374* (2013.01); *B60C 2011/0381* (2013.01); *B60C 2011/133* (2013.01); *B60C 2011/1338* (2013.01)

(58) Field of Classification Search
CPC ............. B60C 11/0302; B60C 11/1315; B60C 11/1323; B60C 11/1392; B60C 2011/133
See application file for complete search history.

(56) References Cited

U.S. PATENT DOCUMENTS

| 5,456,301 A * | 10/1995 | Wise | B60C 11/0309 |
| | | | 152/209.15 |
| 6,907,909 B2 | 6/2005 | Himuro | |
| 2002/0062892 A1* | 5/2002 | Himuro | B60C 11/0302 |
| | | | 152/209.18 |
| 2008/0105348 A1* | 5/2008 | Byrne | B60C 11/0302 |
| | | | 152/209.18 |

(Continued)

FOREIGN PATENT DOCUMENTS

| JP | 2000-247110 A | * | 9/2000 |
| JP | 2000-247110 A | | 9/2000 |
| JP | 2001-026205 A | * | 1/2001 |

(Continued)

OTHER PUBLICATIONS

Machine translation for Japan 2009-214699 (Year: 2018).*

(Continued)

*Primary Examiner* — Steven D Maki
(74) *Attorney, Agent, or Firm* — Westerman, Hattori, Daniels & Adrian, LLP

(57) ABSTRACT

Provided is a pneumatic tire including a tread that defines a groove formed between each pair of lands. The groove includes a curved inclined part and a bottom groove part that is located adjacent thereto in a groove width direction. The curved inclined part includes a concave inclined surface that is inclined from a surface of the lands toward a groove depth side. The bottom groove part is located adjacent to the curved inclined part via a stepped portion, and has a bottom surface located on a side deeper than a groove deep end edge of the curved inclined part.

2 Claims, 5 Drawing Sheets

(56) References Cited

U.S. PATENT DOCUMENTS

2011/0146863 A1    6/2011  Ochi

FOREIGN PATENT DOCUMENTS

| | | | |
|---|---|---|---|
| JP | 2002-114009 A | | 4/2002 |
| JP | 2003-326918 A | | 11/2003 |
| JP | 2005-35370 A | | 2/2005 |
| JP | 2007-112218 A | | 5/2007 |
| JP | 2007-153261 A | | 6/2007 |
| JP | 2008-162363 A | | 7/2008 |
| JP | 2009-214699 A | * | 9/2009 |
| JP | 2010-105552 A | | 5/2010 |
| JP | 4462667 B2 | | 5/2010 |
| JP | 2010-184570 A | | 8/2010 |

OTHER PUBLICATIONS

Machine translation for Japan 2001-026205 (Year: 2018).*
Machine translation for Japan 2000-247110 (Year: 2018).*
Office Action dated Feb. 16, 2017, issued in counterpart Chinese Patent Application No. 201510902691.9, with English translation. (10 pages).
Office Action dated Jun. 15, 2018, issued in counterpart Japanese Application No. 2014-259264, with English machine translation. (6 pages).

* cited by examiner

PNEUMATIC TIRE

CROSS-REFERENCE TO RELATED APPLICATION

This application claims the benefit of Japanese Patent Application No. 2014-259264, filed on Dec. 22, 2014, which is incorporated herein by reference.

BACKGROUND OF THE INVENTION

Field of the Invention

The present invention relates to a pneumatic tire that is excellent in drainage performance.

Background Art

In a pneumatic tire (hereinafter, referred to as "tire"), it is important to assure drainage performance for suppressing hydroplaning phenomenon which may occur when the vehicle is moving especially at a high speed, in which a water film is built up between the tire tread and the road surface, thereby causing the tire to lose total or partial contact with the road surface and hence causing the tire to ride on the water film on the road surface.

Grooves are formed in the tire tread in order to channel water flow caused due to the rotation of tire and hence assure the water drainage. Here, when grooves having a rectangular cross section are formed, the necessity to form a wide groove is caused in order to secure the groove volume, which results in a problem of decreasing the tire rigidity. When the inner side surface of each groove is formed to be inclined (flattened), the width of the groove bottom can be decreased while securing the same groove volume as that of the groove having the rectangular cross section so that the tire rigidity can be relatively improved. However, there is no substantial difference in respect of water drainage performance between those grooves. Further, as described in JP 2010-184570 A, when the groove's inner side surface is formed to be curved, the groove volume can be increased by the curved inner side surface as compared with the groove having the inclined flat inner side surface. However, such curved inner side surface causes vortex flow due to water flowing along the curved inner side surface, which prevents smooth water drainage.

SUMMARY OF THE INVENTION

The present invention therefore provides a pneumatic tire that can secure a groove volume enabling water to flow while securing the tire rigidity, and provides a good drainage water flow in a groove.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to the present invention, there is provided a pneumatic tire including: a tread that defines at least one groove formed between each pair of lands, the at least one groove comprising a curved inclined part and a bottom groove part that is located adjacent to the curved inclined part in a groove width direction, wherein the curved inclined part includes a concave inclined surface that is inclined from a surface of the pair of lands toward a groove depth side, and wherein the bottom groove part is located adjacent to the curved inclined part via a stepped portion, and has a bottom surface located on a side deeper than a groove deep end edge of the curved inclined part.

In the aforesaid pneumatic tire, it may be configured so that the at least one groove extends in a direction inclined relative to a tire equator as viewed in a tire radial direction, and the curved inclined part is located on a stepping-in side of an inner side surface of the at least one groove.

Further, in the aforesaid pneumatic tire, it may be configured so that the at least one groove comprises plural grooves, wherein each of the plural grooves extends in a direction inclined relative to the tire equator as viewed in the tire radial direction, and is inclined in a direction to be directed from a center area toward a shoulder part of the tread, wherein a depth of the curved inclined part from a surface of the pair of lands is small in an area close to the center area and an area close to the shoulder part, and is large in an intermediate area therebetween, and wherein, of each two adjacent ones of the plural grooves, an area having a small depth of the curved inclined part in one groove is located adjacent to an area having a large depth of the curved inclined part in the other groove in a tire width direction.

BRIEF DESCRIPTION OF THE DRAWINGS

The foregoing and other features of the present invention will become apparent from the following description and drawings of an illustrative embodiment of the invention in which.

DETAILED DESCRIPTION OF THE PREFERRED EMBODIMENT

Figure 1:
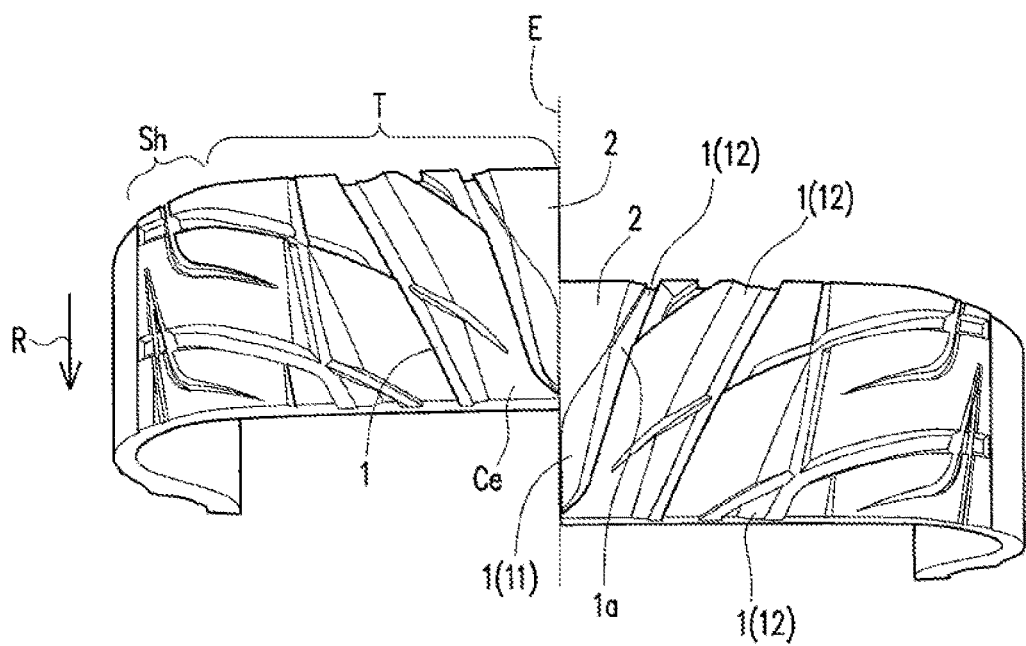
FIG. 1 is a perspective view of a certain area of a tire tread, showing a tread pattern of a pneumatic tire according to an embodiment of the present invention.

The description is given for a pneumatic tire according to one embodiment of the present invention. FIG. 1 is a view showing a tread pattern of a tire of the present embodiment, and specifically a view of a certain area taken out of the tire tread, showing one side area and another side area in the tire width direction (the right and left direction in FIG. 1) with a tire equator E therebetween, in which the first side area and the second side area are displaced to each other in the tire circumferential direction.

Brief Overview

The tread pattern of the tire is a "center rib pattern" having a center rib 2 formed in a center area Ce of a tread T, and appearing asymmetrically with reference to the tire equator E shown in FIG. 1. More specifically, while the groove shape itself is symmetrically formed with reference to the tire equator E, the one side area and the other side area in the tire width direction with the tire equator therebetween are displaced ½ pitch in the tire circumferential direction to each other so that the groove shape asymmetrically appears.

The tire is attached to the vehicle so as to rotate in a tire rotation direction R shown in FIG. 1. The lower side and the upper side shown in FIG. 1 represent an advance side and a delay side of the tire rotation direction R, respectively. Also, the lower side and the upper side shown in FIG. 1 represent a kicking-out side and a stepping-in side, respectively. The tire is of a "one-way type", which is used with the rotational direction constant. Since the tire is of the "one-way type", the directionality of the tread pattern remains constant with respect to the tire rotation direction R. Therefore, it is possible to constantly produce the functions of a later-described inclined main groove 1 (drainage performance, rigidity of lands (blocks)).

Inclined Main Groove

Plural inclined main grooves 1 are formed in the tread T. Each inclined main groove 1 is a groove formed between each pair of lands, and is formed to be inclined relative to the tire equator E as viewed in the tire radial direction so as to be directed from a center area Ce to a shoulder part Sh of the tread. As shown in FIG. 1, formed in the tread T are a narrow groove cured so as to cross the inclined main groove 1, and a narrow groove reaching the shoulder part Sh. A detailed description for these narrow grooves is herein omitted.

As shown in FIG. 1, three inclined main grooves 1 are formed adjacent to each other in one side area in the tire width direction of the tire equator E (corresponding to one side in a vehicle inside-outside direction when the tire is attached to the vehicle). In FIG. 1, the tread T is cut out to a certain extent in a rectangular shape in the tire circumferential direction, and therefore the overall appearance of the inclined main groove 1 is not shown. Thus, one inclined main groove 1 taken out of the tread T is shown in FIG. 2.

The inclined main groove 1 produces a function of guiding water toward the shoulder part Sh when the tread T is grounded. The direction in which the drained water passes through the inclined main groove 1 is opposite to the tire rotation direction R. Therefore, the tire can have a good water drainage performance. The inclined main groove 1 is composed of successive formation of a first inclined main groove 11 that is located close to the tire equator E, and a second inclined main groove 12 that is located far from the tire equator E. That is, the first inclined main groove 11 is a groove that is formed in the center area Ce of the tread T, and is connected to the second inclined main groove 12 that serves as a connected groove formed close to the shoulder part Sh of the tread T. The first inclined main groove 11 is located on the advance side of the tire rotation direction R, and the second inclined main groove 12 is located on the delay side of the tire rotation direction R.

Figure 2:
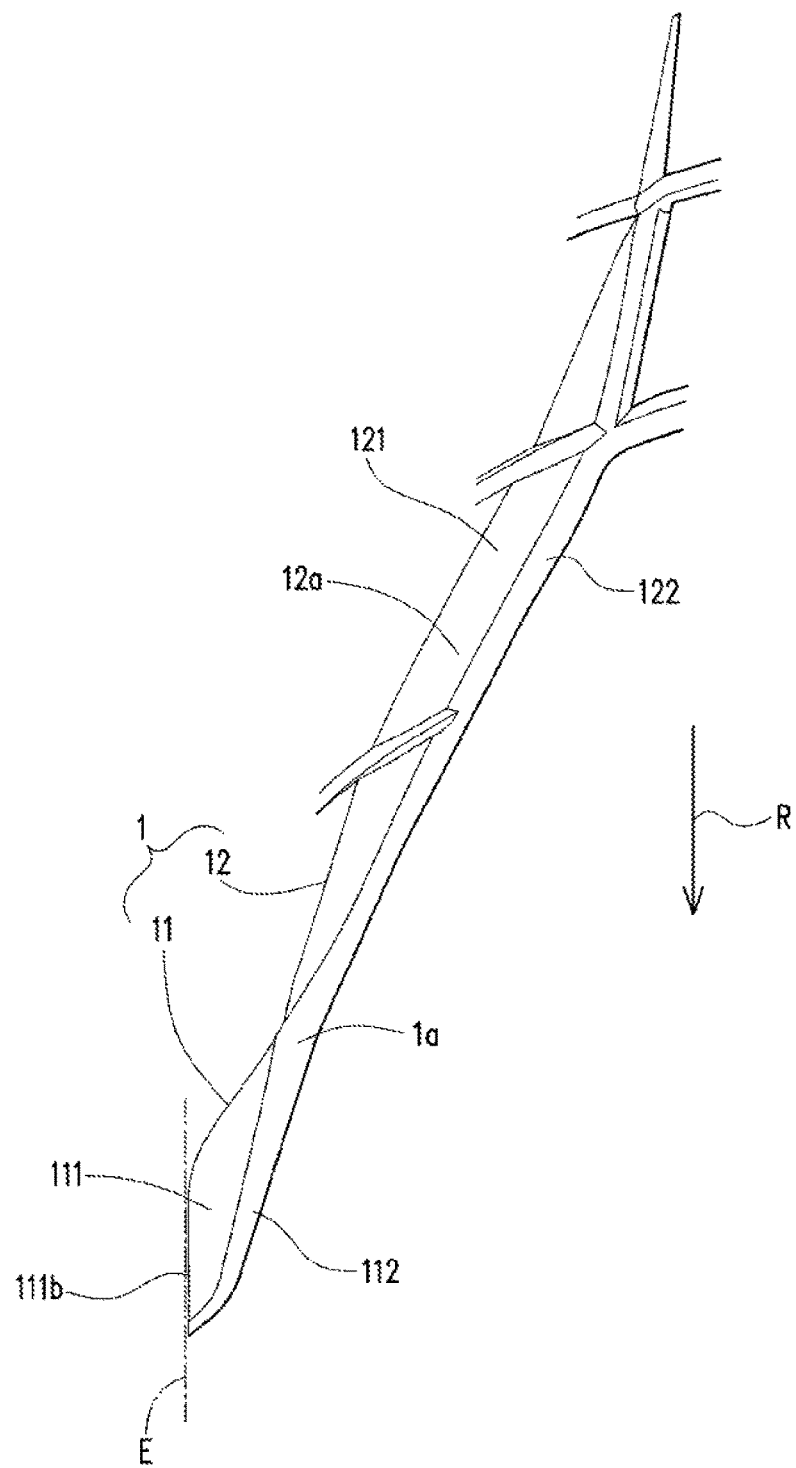
FIG. 2 is a schematic view of an inclined main groove taken out of the tire tread of the pneumatic tire as viewed from the tire radial direction.

As shown in FIG. 2, the width of the first inclined main groove 11 increases as it approaches the delay side (upper side in FIG. 2) of the tire rotational direction R, then decreases and is connected to the second inclined main groove 12. The width of the second inclined main groove 12 increases from its connection part 1a with the first inclined main groove 11 as it advances toward the delay side of the tire rotation direction R. Therefore, the inclined main groove 1 has a constriction shape as viewed in the tire radial direction at the connection part 1a of the first inclined main groove 11 and the second inclined main groove 12. Provision of the constriction shape at the connection part 1a secures an area of a land (specifically a center rib 2) in the center area Ce of the tread T and hence contributes to the straight advance stability of the vehicle. Further, the thus constricted connection part 1a provides an enhanced aesthetic appearance which appeals to users.

As shown in FIG. 1, the inclined main groove 1 formed in the one side area and the inclined main groove 1 formed in the other side area in the tire width direction With the tire equator E therebetween are provided alternately while being displaced ½ pitch in the tire circumferential direction to each other. With this configuration, the inclined main groove 1 formed on the one side area and the inclined main groove 1 formed on the other side area are alternately grounded. Thus, the water drainage performance can be equally provided in the circumferential direction, and water can be alternately drained by both side areas, which results in a good drainage performance. Also, since the inclined main groove 1 formed on the one side area and the inclined main groove 1 formed on the other side area are not grounded at the same time, the hammering noise caused when they are grounded can be reduced.

The land between the inclined main grooves 1 aligned in the tire circumferential direction in the center area Ce of the tread T serves as the center rib 2. The center rib 2 can secure the rigidity of the center area Ce and hence contributes to a good straight advance stability of the vehicle. Plural center ribs 2 formed alternately in the one side area and the other side area are located adjacent to each other to have the lands connected to each other with the tire equator E therebetween, as shown in FIG. 1. This configuration also can suppress deforming or collapsing of the center rib 2 and hence secure the rigidity of the center area Ce.

First Inclined Main Groove

Figure 3:
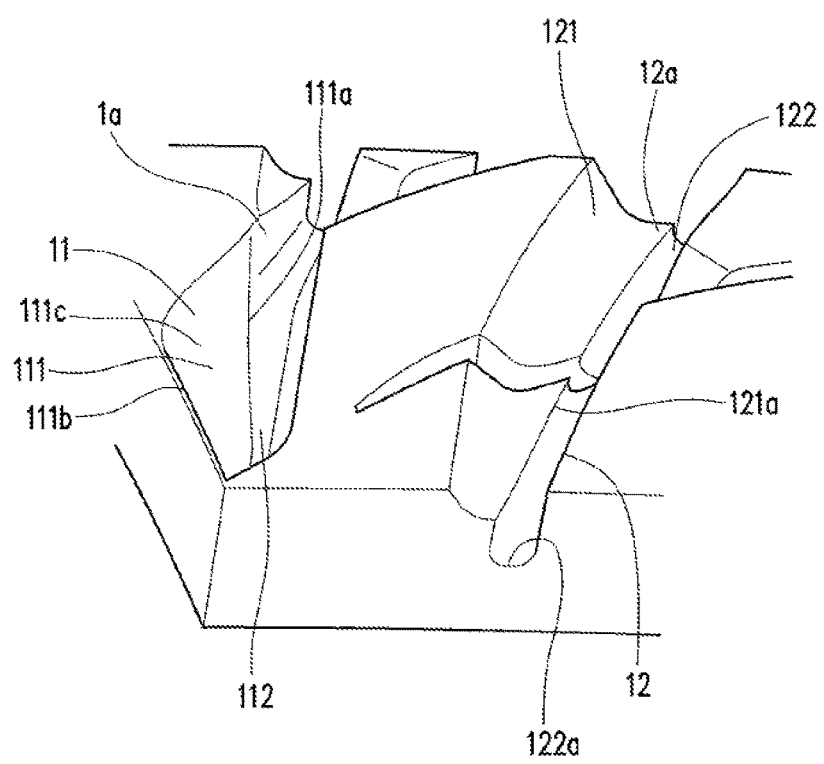
FIG. 3 is an enlarged perspective view of a main part of the pneumatic tire, showing a certain area taken out of the tire tread, specifically a first inclined main groove and a second inclined main groove.
Figure 5:
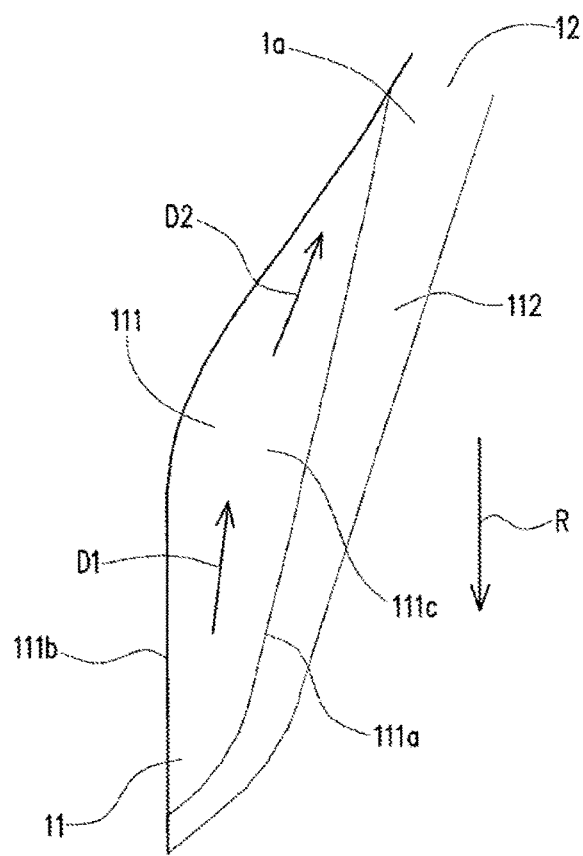
FIG. 5 is an enlarged view of a main part of the pneumatic tire showing the first inclined main groove taken out of the tire tread.

The first inclined main groove 11 includes a guide side wall 111 and a first bottom groove part 112. The guide side wall 111 is a side wall on one side in the groove width direction of the first inclined main groove 11, and, as shown in FIGS. 2, 3 and 5, is formed on the stepping-in side of the first inclined main groove 11. Thus, the guide side wall 111 is provided to the first inclined main groove 11 itself, so that water can be made to stably flow into the second inclined main groove 12 as compared with the configuration in which an inclined surface is located away from a groove through which drained water is made to pass, which is described in JP 2010-184570A. The guide side wall 111 also has a dimension in the tire width direction which increases as it advances toward the delay side (upper side in Figures) of the tire rotation direction R, then decreases in the same manner as the groove width of the first inclined main groove 11, and, as shown in FIG. 5, is maximized at a center part 111c of the guide side wall 111.

The guide side wall 111 is a side wall on the tire equator E-side of the first inclined main groove 11. Therefore, water located on the land of the center area Ce of the tread T is guided along the inclined surface of the guide side wall 111 from the tire equator E, and thereby can be guided to the bottom part (first bottom groove part 112) of the fast inclined main groove 11, so that smooth formation of flow of drained water in a direction away from the tire equator E in the tire width direction can be realized.

Figure 4A:
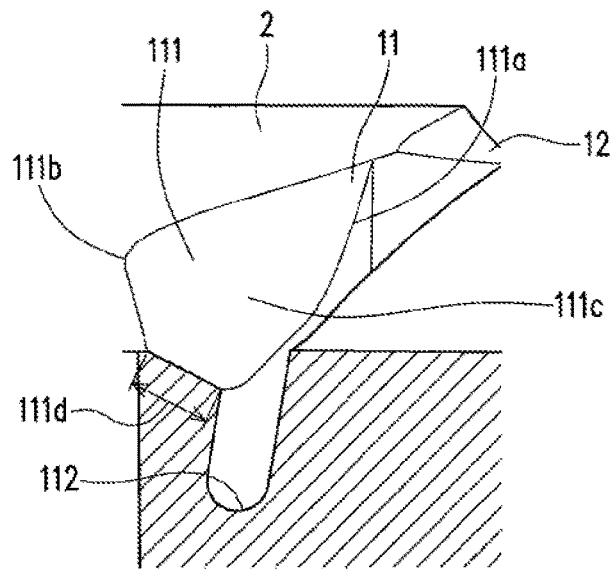
FIG. 4A is an enlarged perspective view of a main part of the pneumatic tire, showing a cross sectional shape of the first inclined main groove taken in the tire radial direction, in which the first inclined main groove is cut at a position on an advance side of the tire rotational direction.
Figure 4B:
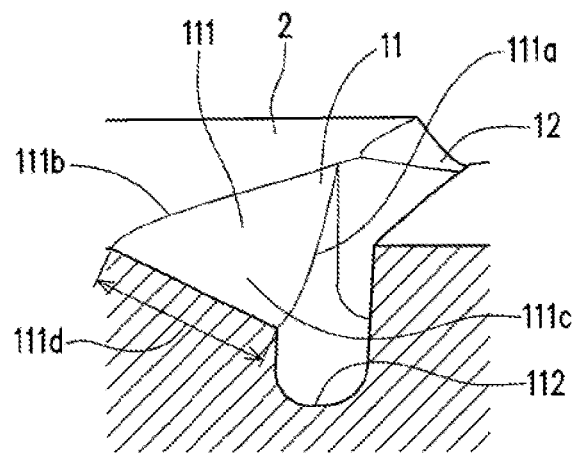
FIG. 4B is an enlarged perspective view of a main part of the pneumatic tire, showing a cross sectional shape of the first inclined main groove taken in the tire radial direction, in which the first inclined main groove is cut at a position on a delay side of the tire rotational direction compared with the position of FIG. 4A.
Figure 4C:
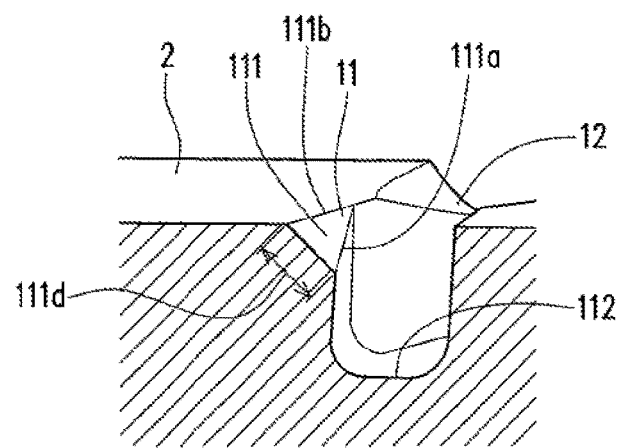
FIG. 4C is an enlarged perspective view of a main part of the pneumatic tire, showing a cross sectional shape of the first inclined main groove taken in the tire radial direction, in which the first inclined main groove is cut at a position on a delay side of the tire rotational direction compared with the position of FIG. 4B.

The guide side wall 111 has an inclined surface that is inclined from the surface of the land of the tread T toward a groove depth side. As shown in FIG. 4(a) to FIG. 4(c), this inclined surface has a cross sectional shape which appears as a straight line when taken in the direction crossing the direction in which the first inclined main groove 11 extends. As shown in FIG. 5, this inclined surface is curved to extend from the center area Ce toward the shoulder part Sh as it goes from its portion far from the second inclined main groove 12 (the portion on the advance side of the tire rotation direction R in the present embodiment) to its portion close to the second inclined main groove 12 (the portion on the delay side of the tire rotation direction R in the present embodiment). In FIG. 5, directions in which phantom lines that each lie at an equal distance from a groove deep end edge 111a of the guide side wall 111 and a tire radially outward end edge 111b extend, are respectively indicated as a direction D1 in a portion far from the second inclined main groove 12, and as a direction D2 in a portion close thereto for short. This curvature can guide water on the guide side wall 111 to the second inclined main groove 12 while changing the direction of the water flow, as the tire rotates. As shown in FIG. 5, in association with the inclined surface of the first inclined main groove 11 which is curved, the radially outward end edge 111b is also curved to extend from the center area Ce toward the shoulder part Sh as it approaches the second inclined main groove 12. The inclined surface of the guide side wall 111 is formed with a curvature as described above. However, the inclined surface may be formed by, for example, successive linear surfaces which are bent to form a curvature, and it is essential that the inclined surface is oriented so as to extend from the center area Ce to the shoulder part Sh.

A distance 111d between the groove deep end edge 111a of the guide side wall 111 and the land surface is small at an end far from the second inclined main groove 12 as shown in FIG. 4(a), gradually increases and is maximized at a center part 111c of the guide side wall 111 as shown in FIG. 4(b), and gradually decreases and becomes again small as approaching the connection part 1a with the second inclined main groove 12, as shown in FIG. 4(c). That is, the groove deep end edge 111a has a curvature extending through a deepest part of the groove at the center part 111c (a part of the curvature appears in FIG. 4(a)). Therefore, the inclined surface of the guide side wall 111 is inclined to increase in depth (depth from the land surface) toward the center part 111c. Therefore, water present in the area on the kicking-out side of the guide side wall 111 can be guided to the first bottom groove part 112 while being directed to the center part 111c.

The inclined surface of the guide side wall 111 becomes gradually smaller as it goes from the center part 111c toward the connection part 1a with the second inclined main groove 12. That is, as is being apparent from the comparison between FIGS. 4(a) to 4(c), the proportion of the volume occupied by the first bottom groove part 112 in the volume of the first inclined main groove 11 increases. Therefore, the first inclined main groove 11 is configured so that, as going from the center part 111c toward the connection part 1a with the second inclined main groove 12, water which has been already collected in the first bottom groove part 112 is directed to the second inclined main groove 12 more preferentially to guiding water to the first bottom groove part 112 via the guide side wall 111. Therefore, water drainage into the second inclined main groove 12 can be efficiently performed.

Further, the inclined surface of the guide side wall 111 has such a shape that it is twisted while rising up as it approaches the second inclined main groove 12. That is as compared with a portion far from the second inclined main groove 12 and an intermediate portion shown respectively in FIGS. 4(a) and 4(b), a portion close to the second inclined main groove 12 shown in FIG. 4(c) is sharply inclined. Therefore, in an area between the portion far from the second inclined main groove 12 and the intermediate portion where the inclination is relatively gentle, water is preferentially guided to the second inclined main groove 12. On the other hand, in an area between the intermediate part and the part close to the second inclined main groove 12, where the inclination is relatively sharp, the guide side wall 111 acts like a "wall" against the flow of water guided to the second inclined main groove 12 due to the curvature of the guide side wall 111 because of the sharp inclination, water is prevented from going out onto the land over the first inclined main groove 11 while can be made to flow along the first bottom groove part 112. Thus, in an area between the intermediate portion and the portion close to the second inclined main groove 12, water flowing through the first bottom groove part 112 is guided to the second inclined main groove 12 preferentially to the guiding of water to the first bottom groove part 112.

In other words, the inclination in an area between the portion far from the second inclined main groove 12 and the intermediate portion is such an inclination as to guide water to the first bottom groove part 112, and the inclination in an area between the intermediate portion and the portion close to the second inclined main groove 12 is such an inclination as to guide water to the second inclined main groove 12. Thus, the function preferentially provided in an area far from the second inclined main groove 12 in the guide side wall 111 is different from the function preferentially provided in an area close to the second inclined main groove 12. Therefore, water drainage to the second inclined main groove 12 can be efficiently performed.

As shown in FIG. 2, of the guide side wall 111, the radially outward end edge 111b in a portion of the first inclined main groove 11 far from the second inclined main groove 12 is parallel to the tire equator E as viewed in the tire radial direction. Therefore, the distance between the radially outward end edge 111b and the tire equator E is constant so that water on the land (center rib 2) of the center area Ce can be guided to the guide side wall 111 evenly in the tire circumferential direction.

In particular, in the present embodiment, the radially outward end edge 111b substantially coincides with the tire equator E. Specifically, the radially outward end edge 111b is located at a position close to the tire equator E but not exceeding the tire equator E. Therefore, water present on the tire equator E when the tire is grounded can be made to very rapidly flow into the first inclined main groove 11. Thus, it is possible to suppress occurrence of hydroplaning phenomenon which is caused by a water film on which the part of the tire equator E of the tread T rides on.

The aforesaid inclination is so that the guide side will 111 in a portion where the radially outward end edge 111b is parallel to the tire equator E is inclined in the tire width direction and is inclined in a direction away from the tire equator E to the groove depth side. That is, this inclination is an inclination parallel to the tire equator E. Thus, it is possible to guide water located between the road surface and the center rib 2 to the first inclined main groove 11, and, at the same time, secure the rigidity of the land as compared with the case where the guide side wall 111 is composed of a wall surface parallel to the tire equator E and perpendicular to the land. As a result, a high straight-traveling stability is obtainable.

As described above, the inclined main grooves 1 respectively formed on the one side area and the other side area of the tread T in the tire width direction with the tire equator E therebetween are alternately formed in the tire circumferential direction. Thus, the same is also applicable to the first inclined main groove 11. That is, the first inclined main grooves 11 respectively formed on the one side area and the other side area of the tread T in the tire width direction are alternately formed in the tire circumferential direction with reference to the tire equator E. Therefore, as described above on the inclined main groove 1, the first inclined main groove 11 formed on the one side area and the first inclined main groove 11 formed on the other side area are alternately grounded. Therefore, even by the first inclined main grooves 11, the water drainage performance can be equally provided in the tire circumferential direction, and water can be alternately drained by both side areas, which results in a good drainage performance.

As described above, water present in the center area Ce can be instantly drained by providing the center area Ce of the tread T with the first inclined main grooves 11. This configuration is especially effective in a tire of a "center rib pattern" like the present embodiment in view of suppressing the hydroplaning phenomenon.

Second Inclined Main Groove

As shown in FIG. 3, the second inclined main groove 12 has a curved inclined part 121 and a second bottom groove part 122 that is located adjacent to one side of the curved inclined part 121 in the groove width direction. The curved inclined part 121 is a concave inclined surface that is inclined from the surface of the land toward a groove depth side. This concave surface is a curved surface, of which a cross sectional shape taken in a direction crossing a direction in which the second inclined main groove 12 extends appears as a curving line concave toward the inside of the tire. The second bottom groove part 122 is located adjacent to the curved inclined part 121 through a stepped portion 12a. This stepped portion 12a has such a shape that the second bottom groove part 122 is concave toward the groove depth side from the curved inclined part 121. Thus, a bottom surface 122a of the second bottom groove part 122 is located on a side deeper than a groove deep end edge 121a of the curved inclined part 121.

With the above configuration, in which the second inclined main groove 12 includes the second bottom groove part 122 having the inclined surface, the groove width of the bottom portion can be set to be smaller in dimension than the groove having a simple rectangular cross section. Thus, the tire rigidity can be secured. Further, with the above configuration, in which the inclined surface of the curved inclined part 121 is a concave surface, an increased groove volume by a concave amount can be secured as compared with a flat surface. As the tire rotates, water is guided along the curved inclined part 121 to the second bottom groove part 122, then is made to pass through the second bottom groove part 122 that is located inward of the curved inclined part 121 in the tire radial direction by the stepped portion 12a and hence drained. Therefore, water is mainly guided in the curved inclined part 121, and is mainly collected in the second bottom groove part 122 and is made to flow therein in the extending direction of the second inclined main groove 12. That is, the curved inclined part 121 is configured exclusively to guide water, and the second bottom groove part 122 is configured exclusively to drained water. Thus, it is possible to suppress occurrence of swirling current in a groove bottom due to joining of a guided water flow and a drained water flow, and hence suppress a smooth flow of drained water from being blocked. As a result, water can be efficiently drained. Thus, the tire of the present embodiment can simultaneously achieve both functions of securing the tire rigidity and securing a good water draining performance by providing the second inclined main groove 12.

Also, the inclined surface of the curved inclined part 121, which is a concave surface, makes it possible to reduce the landing shock caused by landing on a water film on the road surface. Because of this, the second inclined main groove 12 can smoothly enter a water film on the road surface, and thereby push aside water, thereby suppressing occurrence of hydroplaning phenomenon caused by a water film on the road surface on which the tread T rides on.

As shown in FIG. 2, the end edges in the groove width direction of the second inclined main groove 12 and the end edges in the groove width direction of the first bottom groove part 112 are positioned substantially in conformity to an arc continuous in the tire circumferential direction. The arc is curved to be convex toward the tire equator E, except the end portion on the delay side in the tire rotation direction R. As shown in FIG. 2, in the end portion on the delay side of the tire rotation direction R, the second bottom groove part 122 has a straight shape extending away from the tire equator E as it approaches the delay side of the tire rotation direction R, and the curved inclined part 121 has a triangular shape having a width reduced as it approaches the delay side of the tire rotation direction R.

With the above shapes, a flow of drained water can be formed into a substantially arc shape in the most portion of the inclined main groove 1, and therefore the resistance of the drained water in the inclined main groove 1 can be reduced. Also, since the first inclined main groove 11 (especially the first bottom groove part 112 thereof) and the second inclined main groove 12 can be seen to be integral with each other, an excellent aesthetic appearance is obtainable.

As shown in FIG. 1, the second inclined main groove 12 extends in a direction inclined relative to the tire equator E as viewed in the tire radial direction. The curved inclined part 121 is located on the stepping-in side of an inner side surface of the second inclined main groove 12. On the other hand, the inner side surface on the kicking-out side of the second inclined main groove 12 is flat substantially perpendicular to the land surface, as shown in FIG. 3. With such a configuration in which the curved inclined part 121 is located on the stepping-in side of the inner side surface of the second inclined main groove 12, water can be made to flow from the end edge on the kicking-out side of the land to the curved inclined part 121. Thus, it is possible to eliminate a water film from between the road surface and the land and thereby suppress occurrence of hydroplaning phenomenon. Also, with such a configuration in which a side surface on the stepping-in side of the land is inclined or chamfered, the land can have a rigidity (specifically a rigidity of a block adjacent to the curved inclined part 121) higher than the rigidity of a land having a perpendicular wall on its stepping-in side. Therefore, it is possible to suppress the land from deforming or collapsing onto the second inclined main groove 12 during braking operation. Thus, a good braking force is obtainable.

In the present embodiment, the curved inclined part 121 is located only on the stepping-in side of the inner side surface of the second inclined main groove 12, while being not located on the kicking-out side thereof. This is not essential. The second inclined main groove 12 may be configured such that the curved inclined part 121 is provided on each of both sides with the second bottom groove part 122 therebetween.

The depth of the curved inclined part 121 from the surface of the land is small in an area close to the center area Ce of the tread T and an area close to the shoulder part Sh of the tread T, and large in an intermediate area therebetween. Therefore, at the initial stage when the tire is grounded, the area having a small depth first contacts the road surface, then the area having a large depth contacts the road surface, and then the area having a small depth contacts the road surface. Therefore, when compared to the case where a groove having a large depth suddenly contacts a water film, the landing shock caused by landing on a water film can be reduced. Therefore, it is possible to smoothly or non-interruptingly reduce the landing shock over the sequence from stepping-in to the kicking-out, of the second inclined main groove 12.

Of each two adjacent ones of the second inclined main grooves 12 located adjacent to each other, an area of the curved inclined part 121 having a large depth in the one second inclined main groove 12 is located adjacent to an area of the curved inclined part 121 having a large depth of the other second inclined main groove 12 in the tire width direction.

Therefore, it is possible to make constant the total volume of the combination of the adjacent ones of the second inclined main grooves 12 located adjacent to each other in the tire width direction as much as possible. Thus, it is possible to suppress fluctuation of the drainage efficiency in the tire circumferential direction and hence achieve a uniform drainage efficiency. Accordingly, a stable water drainage performance can be secured. An average value of the rigidity in the tire width direction of the blocks defined by the second inclined main groove 12 can be equalized. As a result, a good handling stability can be obtained especially during running on a dry road.

Conclusion

As described above, the tire of the present embodiment can simultaneously achieve a high travelling performance or a high handling stability on a dry road and a high travelling performance or a high water draining performance on a wet road.

The present invention is not limited to the aforementioned embodiment, and the design can be appropriately modified within the scope intended by the present invention.

As described above, the pneumatic tire of the present embodiment includes the tread T that defines at least one groove (second inclined main groove) 12 formed between each pair of lands, the at least one groove (second inclined main groove) 12 including the curved inclined part 121 and the bottom groove part 122 that is located adjacent to the curved inclined part 121 in the groove width direction. The curved inclined part 121 includes a concave inclined surface that is inclined from a surface of the pair of lands toward a groove depth side. The bottom groove part 122 is located adjacent to the curved inclined part 121 via the stepped portion 12a, and has a bottom surface located on a side deeper than the groove deep end edge 121a of the curved inclined part 121.

According to the above configuration, the curved inclined part 121 having the inclined surface provided in the groove (second inclined main groove) 12 makes it possible to secure the tire rigidity as compared with a groove having a simple rectangular cross section. In addition, since the curved inclined part 121 has the inclined surface which is concave, the volume can be increased by the concave amount, and hence a higher volume of the groove can be secured. Water is guided along the curved inclined part 121 to the bottom groove part 122, then is made to pass through the bottom groove part 122 that is located inward of the curved inclined part 121 in the tire radial direction by the stepped portion 12a, and then drained. Therefore, water is mainly guided in the curved inclined part 121, and is mainly made to flow in a direction in which the groove extends in the bottom groove part 122. Thus, water can be efficiently drained.

Further, it may be configured so that the at least one groove (second inclined main groove) 12 extends in a direction inclined relative to the tire equator E as viewed in the tire radial direction, and the curved inclined part 121 is located on the stepping-in side of of the inner side surface of the at least one groove (second inclined main groove) 12.

According to the above configuration, water can be made to flow to the curved inclined part 121 from the end edge on the kicking-out side of the land, and therefore it is possible to eliminate a water film from between the road surface and the land and thereby suppress occurrence of hydroplaning phenomenon.

Further, it may be configured so that the at least one groove includes plural grooves (second inclined main grooves) 12, each of the plural grooves extending in a direction inclined relative to the tire equator E as viewed in the tire radial direction, and is inclined in a direction to be directed from the center area Ce toward the shoulder part Sh of the tread T, wherein the depth of the curved inclined part 121 from the surface of the land is small in an area close to the center area Ce and an area close to the shoulder part Sh, and is large in an intermediate area therebetween, wherein, of each two adjacent ones of the plural grooves, an area having a small depth of the curved inclined part 121 in the one groove is located adjacent to an area having a large depth of the curved inclined part 121 in the other groove in the tire width direction.

According to the above configuration, it is possible to suppress fluctuation of the drainage efficiency in the tire circumferential direction and hence achieve a uniform drainage efficiency by making constant the total volume of the combination of each adjacent ones of the plural grooves (second inclined main grooves) 12 located adjacent to each other in the tire width direction as much as possible.

Thus, the pneumatic tire of the present embodiment makes it possible to produce effects of securing a sufficient groove volume for water flowing, while securing the tire rigidity, and producing a good drainage water flow in a groove depth side.

The pneumatic tire of the present embodiment is as described above. However, the present invention is not limited thereto, and the design can be appropriately modified within the scope intended by the present invention. The operational advantage of the present invention is also not limited to the foregoing embodiments. The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. A pneumatic tire comprising:
   a tread that defines at least one groove formed between each pair of lands, the at least one groove comprising a curved inclined part and a bottom groove part that is located adjacent to the curved inclined part in a groove width direction, wherein the curved inclined part is located only on a stepping-in side of an inner side surface of the at least one groove, and includes a concave inclined surface that is inclined from a surface of the pair of lands toward a groove depth side, wherein the bottom groove part is located adjacent to the curved inclined part via a stepped portion, and has a bottom surface located on a side deeper than a groove deep end edge of the curved inclined part, wherein the at least one groove comprises plural grooves, wherein each of the plural grooves extends in a direction inclined relative to the tire equator as viewed in the tire radial direction, and is inclined in a direction to be directed from a center area toward a shoulder part of the tread, wherein a depth of the curved inclined part from a surface of the pair of lands is small in an area close to the center area and an area close to the shoulder part, and is large in an intermediate area therebetween, and wherein, of each two adjacent ones of the plural grooves, an area having a small depth of the curved inclined part in one groove is located adjacent to an area having a large depth of the curved inclined part in the other groove in a tire width direction.

2. The pneumatic tire according to claim 1, wherein the at least one groove extends in a direction inclined relative to a tire equator as viewed in a tire radial direction.

* * * * *